Patented Nov. 16, 1948

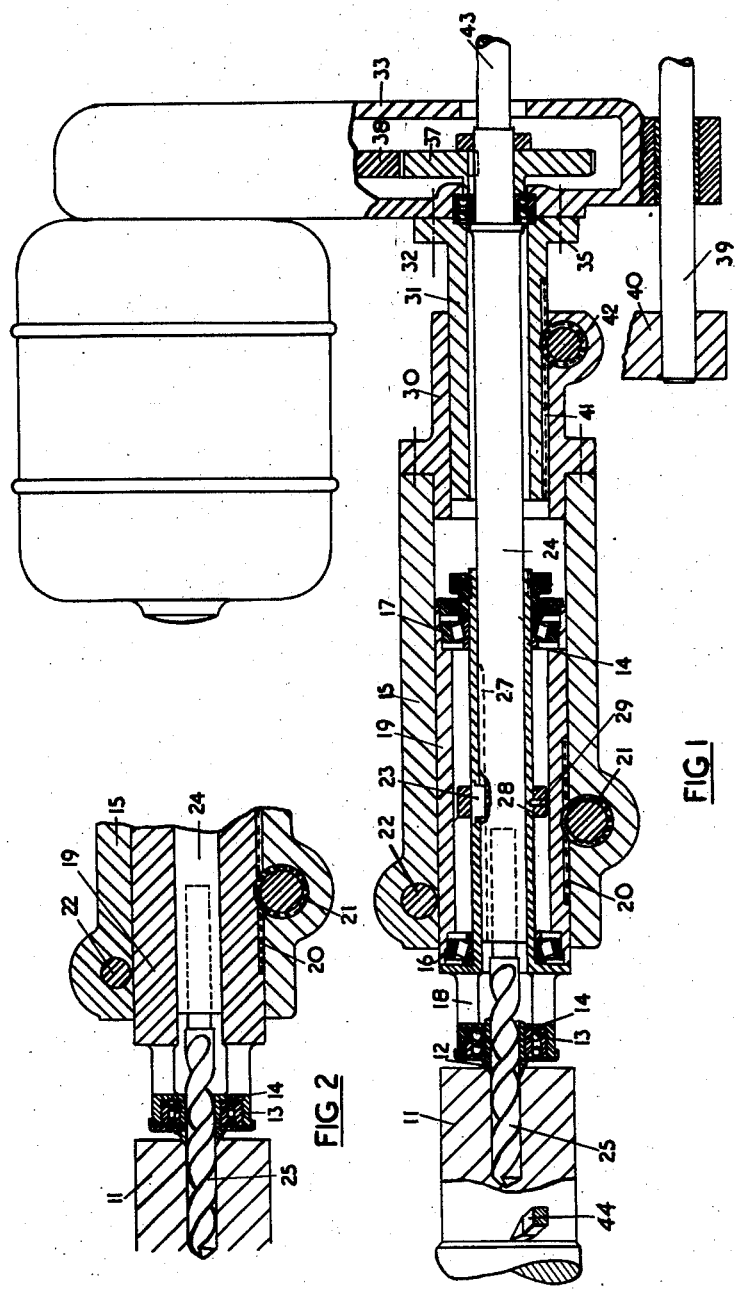

2,453,825

UNITED STATES PATENT OFFICE 2,453,825

TAILSTOCK LATHE FOR DRILLING

Samuel Bailey Wright, Coventry, England

Application June 20, 1945, Serial No. 600,527
In Great Britain April 5, 1945

12 Claims. (Cl. 77—60)

This invention relates to a tail-stock lathe, and my main object is to provide a very simple arrangement by means of which a bore can be drilled in a workpiece in a satisfactory manner whilst the surface of the workpiece is being cut by one or more tools.

According to the invention, the end of the workpiece remote from the lathe spindle is carried by a hollow center rotatively supported from the tail-stock, and an axially-slidable and rotatable shaft on the tail-stock, coaxial with the workpiece, is adapted to carry a drill or the like tool and to be rotated at a speed related to that of the lathe spindle as necessary for the drilling or like operation, so that the workpiece may be driven by the spindle at an appropriate speed for any external turning operation to be applied thereto, openings being provided as necessary to carry away the swarf arising from the drilling or like operation.

In a preferred arrangement the hollow center is journalled in a sleeve which is in turn journalled in a barrel which is axially adjustable in the tail-stock, openings being provided in the sleeve (clear of the barrel) to carry away the swarf from the drill or the like tool by centrifugal action, the sleeve having a sliding and driving connection with the shaft so as to rotate in unison therewith (and therefore with the drill or the like tool). This is advisable in the case of a workpiece of steel where the swarf from the drill or the like tool may come off in long lengths; but it is not necessary in the case of cast iron or brass, when the swarf will come off as relatively-small chips, that the openings should rotate in unison with the tool.

In the drawings Figure 1 is a longitudinal section illustrating the preferred construction and Figure 2 is a similar view illustrating a modified construction.

In the construction shown in Figure 1, the work 11 is carried remote from the lathe spindle by a hollow center 12 journalled by means of a double ball bearing 13 in one end of a sleeve 14 journalled in the tail-stock 15 by means of spaced opposed taper roller bearings 16, 17. Openings 18, for the swarf, are provided in the sleeve 14. The outer race rings of the bearings 16, 17 are shown as being carried by a barrel 19 which is itself adjustable axially of the tail-stock, as by means of a rack 20 and pinion 21, provision being made as by a clamp screw at 22 for clamping the barrel in an adjusted position.

Slidably keyed at 23 within the sleeve 14 is a shaft 24 adapted to carry a drill 25 or the like tool to extend axially into the adjacent end of the work 11, the tool preferably being slidably supported by the center 12.

As shown, the key 23 is supported on ledges 26 at the ends of a slot in the sleeve, in engagement with a key-way 27 in the shaft, and is located by a ring 28 fixed by a screw 29 to the sleeve.

The center 12 may be a drive fit in the inner race ring of the bearing 13, to allow of replacement by a center with a different bore when a different-diameter drill or like tool is to be used.

The shaft 24 extends to the rear of the tail-stock where provision is made for it to be driven either from the head-stock through an appropriate change-speed gearing, or preferably from a separate electric motor or other variable-speed drive provided for the purpose. With the latter arrangement, one can easily ensure that at whatever speed the work has to be rotated for a turning operation, there will be an appropriate difference of speed between the drill or the like tool and the work such as will facilitate the operation to be carried out by the latter tool.

In the arrangement shown, a housing 30 is bolted to the tail-stock 15 and carries a non-rotatable slidable sleeve 31 having a flange 32 bolted to a gear casing 33 secured to an electric motor 34. A double ball bearing 35, held between the flange 32 and the casing 33, supports the rear of the shaft 24, and the shaft has a flange 36 and carries a pinion 37 which locate it axially with respect to the bearing 35; the pinion being keyed to the shaft and located by a nut 38. The pinion 37 is driven by a gear 38 on the motor shaft, and the motor 34 and gear casing 33 are supported against torque reaction by one or more bars 39 anchored in a frame member 40.

Any appropriate provision is made for feeding the shaft 24 (and with it the drill 25 or the like tool) along the interior of the sleeve 14. For example, in the arrangement shown the sleeve 31, which is axially fast with respect to the shaft, is movable axially in the tail-stock by means of a rack 41 and pinion 42. The latter may be driven independently of, or linked to, the machine, as required. The shaft 24 is preferably provided with a bore 43 to conduct coolant, under pressure, from the driven end to the tool 25.

As the shaft 24 is slidably keyed to the sleeve 14 the latter will always rotate in unison with the tool 25, and the openings 18 can therefore be arranged as necessary to carry away the swarf in a satisfactory manner.

According to the modified construction shown in Figure 2, the rotatable sleeve 14 is omitted and the barrel 19a is made so as to extend from the appropriate face of the tail-stock 15 to provide a journal bearing for the hollow center 12, swarf-discharge openings similar to 18 being provided in the projecting portion of the barrel.

In Figure 1 the work-piece is shown with its right-hand-end of reduced diameter to illustrate the turning of the periphery by the tool 44 (which is shown broken away) at the same time as the work-piece is being drilled.

What I claim as my invention and desire to secure by Letters Patent of the United States is:

1. An arrangement for a tail-stock lathe, for enabling a workpiece to be drilled axially at the same time as a peripheral surface thereof is being turned, comprising a tail-stock, a hollow center for supporting that end of a workpiece which is adjacent said tail-stock, means associated with said tail-stock for supporting said hollow center rotatively and for locating it axially, a tool-holder, rotatable within said tail-stock, for carrying a tool adapted to be fed through said hollow center, and means for feeding said tool-holder.

2. An arrangement, according to claim 1, in which the support for the hollow center comprises a barrel supported non-rotatively but slidably within said tail-stock, a sleeve journalled within said barrel and axially located with respect thereto, a rotative connection between said sleeve and said hollow center, and means for adjusting said barrel axially with respect to said tail-stock.

3. An arrangement for a tail-stock lathe, for enabling a workpiece to be drilled axially at the same time as a peripheral surface thereof is being turned, comprising a tail-stock, a hollow center for supporting that end of a workpiece which is adjacent said tail-stock, a barrel supported non-rotatively but axially-locatably within said tail-stock, a sleeve journalled within said barrel and axially located with respect thereto, a rotative connection between said sleeve and said hollow center, the said connection axially locating said hollow center with respect to said sleeve, a tool-holder non-rotatively but slidably supported within said sleeve, radial means associated with said sleeve, clear of said barrel, and constantly located angularly with respect to said tool-holder, for conducting away swarf arising from the drilling operation, and means for adjusting said barrel axially with respect to said tail-stock.

4. An arrangement for a tail-stock lathe, for enabling a workpiece to be drilled axially at the same time as a peripheral surface thereof is being turned, comprising a tail-stock, a hollow center for supporting that end of a workpiece which is adjacent said tail-stock, means associated with said tail-stock for supporting said hollow center rotatively and for locating it axially, a tool-holder, rotatable within said tail-stock, for carrying a tool adapted to extend through said hollow center, a housing supported non-rotatively within said tail-stock, means for axially locating said tool-holder rotatively within said housing, a rack on said housing, and a pinion on said tail-stock; said rack and pinion serving for feeding said tool-holder.

5. An arrangement, for a tail-stock lathe, for enabling a workpiece to be drilled axially at the same time as a peripheral surface thereof is being turned, comprising a tail-stock, a hollow center for supporting that end of a workpiece which is adjacent said tail-stock, a non-rotative member axially locatable within said tail-stock and supporting said hollow center rotatively, but axially located, a tool-holder, rotatable within said tail-stock, for carrying a tool adapted to extend through said hollow center, and means for feeding said tool-holder.

6. An arrangement, according to claim 5, characterized by a rack associated with said non-rotative member, and by a pinion on said tail-stock, whereby said hollow center can be adjusted axially with respect to said tail-stock.

7. An arrangement, according to claim 5, characterized by radial means associated with said non-rotative member, clear of said tail-stock, for conducting away swarf arising from the drilling operation.

8. An arrangement, for a tail-stock lathe, for enabling a workpiece to be drilled axially at the same time as a peripheral surface thereof is being turned, comprising a tail-stock, a hollow center for supporting that end of a workpiece which is adjacent to said tail-stock, means associated with said tail-stock for supporting said hollow center rotatively and for locating it axially, a tool-holder, rotatable within said tail-stock for carrying a tool adapted to extend through said hollow center, a housing supporting non-rotatively within said tail-stock and surrounding said tool-holder in a rotative manner, means for axially locating said tool-holder with respect to said housing, a rack on said housing and a pinion on said tail-stock for feeding said tool-holder, a gear case secured to said housing, and gearing within said case for communicating drive to said tool-holder.

9. A lathe having a hollow tail-stock, a tool-carrying spindle slidingly and rotatively mounted therein, and a rotatable hollow axially located center for supporting the tail-stock end of a workpiece, said center arranged coaxially with said spindle.

10. A lathe having a hollow tail-stock, a sleeve in said tail-stock, a rotatable tool-carrying spindle slidably mounted in said sleeve, and a hollow work-supporting center rotatably carried and axially located by said sleeve, said sleeve having openings adjacent said center through which can pass swarf machined from the work.

11. A lathe having a hollow tail-stock, a sleeve extending from and journalled in said tail-stock, a hollow center journalled in and axially located by the extended end of said sleeve, the latter provided with a swarf-removing opening between said center and said tail-stock, and a rotatable tool-carrying spindle in said sleeve having a sliding and driving connection therewith.

12. An arrangement for a tail-stock lathe for enabling a workpiece to be drilled axially and have a peripheral surface turned at the same time, comprising a tail-stock, a hollow center for supporting that end of a workpiece which is adjacent said tail-stock, a tool-holder rotatably mounted within said tail-stock, a tool carried by said tool-holder and adapted to be fed through said hollow center, means for feeding said tool, and means associated with said tail-stock for supporting said hollow center to permit the hollow center to be rotated at a speed different from the speed of rotation of the tool-holder.

SAMUEL BAILEY WRIGHT.

REFERENCES CITED

The following references are of record in the file of this patent:

UNITED STATES PATENTS

| Number | Name | Date |
|---|---|---|
| 1,503,836 | Kunzer | Aug. 5, 1924 |
| 1,587,261 | White | June 1, 1926 |
| 2,089,363 | Haas | Aug. 10, 1937 |
| 2,224,480 | Kartarik | Dec. 10, 1940 |

FOREIGN PATENTS

| Number | Country | Date |
|---|---|---|
| 118,153 | Great Britain | Aug. 16, 1919 |
| 289,486 | Great Britain | July 25, 1929 |